Figure 1:
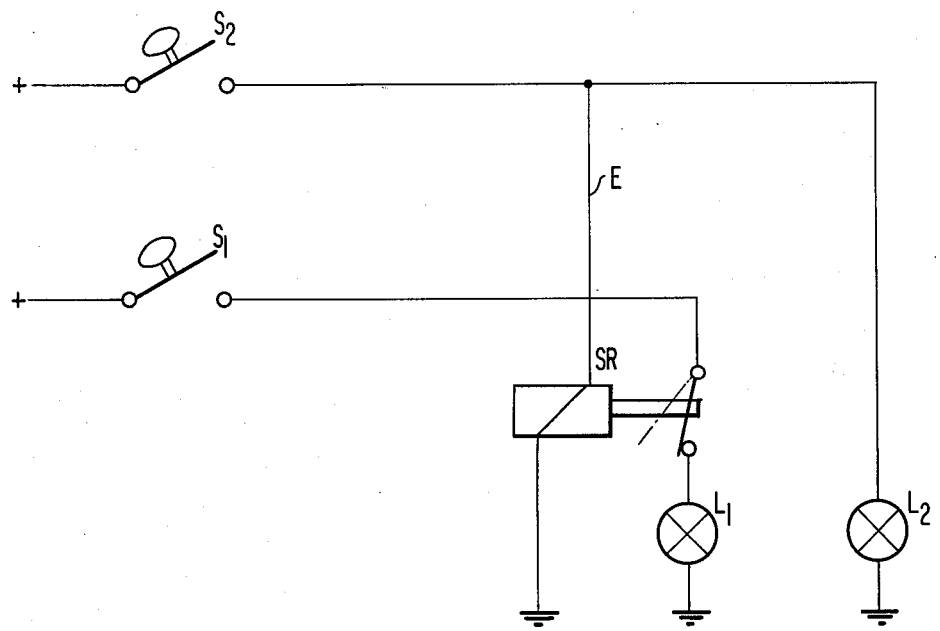

United States Patent [19]

Neuffer

[11] 4,020,457
[45] Apr. 26, 1977

[54] INSTALLATION FOR INCREASING THE BRIGHTNESS DIFFERENCES IN COMBINED MOTOR VEHICLE LIGHTS

[75] Inventor: Klaus Neuffer, Boblingen, Germany

[73] Assignee: Daimler-Benz Aktiengesellschaft, Germany

[22] Filed: Sept. 22, 1975

[21] Appl. No.: 615,679

[30] Foreign Application Priority Data

Sept. 27, 1974 Germany .......................... 2446171

[52] U.S. Cl. .............................. 340/66; 307/10 LS; 340/67; 340/81 R
[51] Int. Cl.² ...................... B60Q 1/38; B60Q 1/30
[58] Field of Search ..................... 340/66, 67, 81 R; 307/10 LS

[56] References Cited

UNITED STATES PATENTS 2,321,803   6/1943   Falge et al. ...................... 340/81 R
3,896,415   7/1975   Carter ................................ 340/67

Primary Examiner—Glen R. Swann, III
Attorney, Agent, or Firm—Craig & Antonelli

[57] ABSTRACT

An installation is provided for increasing the difference in brightness between a pair of lights forming part of a combination light unit, particularly a unit including blinker and position lights for use in motor vehicles, so as to render the lights more easily distinguishable. In a system where a first and a second light are adapted to be switched on and off separately and are arranged in a common housing or in direct proximity of one another, a control element is provided whereby the first light is automatically turned off when the second light is turned on and is again automatically turned on when the second light is turned off.

8 Claims, 2 Drawing Figures

INSTALLATION FOR INCREASING THE BRIGHTNESS DIFFERENCES IN COMBINED MOTOR VEHICLE LIGHTS

The present invention relates to an installation for increasing the brightness differences in combined lights, preferably in blinker and position light of motor vehicles, in which a first and a second light are adapted to be connected to energizing voltage separately and are arranged or mounted in a common housing or in direct proximity to one another.

In motor vehicles, combined lights of the aforementioned type are frequently used, and they generally consist either of individual lamps in a common housing or of two-filament lamps. With such lights, the respective switched-on and switched off condition of the lamp cannot always be recognized unequivocally because of the influence which one lamp has on the other. Thus, for example, with a combination blinker-position light which is constructed as a two-filament lamp of, for example, 5 Watts for the position light and 20 Watts for the blinker light, the recognizability of the blinker signal is impaired by the already existing background brightness provided by the position lamp.

The present invention is concerned with the task of avoiding the described disadvantages of the prior art. Consequently, an installation is proposed, according to which both lights are recognized unequivocally and do not influence one another and interfere with one another. The underlying problems are solved according to the present invention in the installations of the aforementioned type in that the first light is adapted to be automatically turned off when turning on the second light, and in that the first light is adapted to be automatically turned on again when the second light is turned off. In detail, it is then proposed according to the present invention that a switching relay which opens when energized, is connected into the energizing circuit of the first light, whereby the energizing circuit of the switching relay is connected in parallel to the second light.

The proposed installation offers the advantage that each lamp can be unequivocally recognized by itself so that the turned-on condition of both lamps is defined clearly even for the more distant observer. The "outshining effect" which occurred heretofore, is therefore avoided in an advantageous manner by the proposal in accordance with the present invention.

It has already been mentioned that the present invention is preferably applicable with particular advantage, when a turn indicator or blinker light and a position or width-indicating light is involved. For this case, namely, with a blinker light as the second light, which light is switched on by the turn indicator or blinker unit, the present invention proposes that a normally closed time-delay relay that opens when energized be connected in the energizing circuit, and that the releasing-time-constant of the time-delay relay be greater than the dark period of the turn indicator or blinker unit. A further feature of the present invention thereby resides in the fact that the energizing circuit is adapted to be controlled by means of a transistor adapted to be rendered conductive, to the base of which are connected a time-constant circuit, formed by a resistance and condenser, and a blocking diode of the flasher or blinker unit.

Accordingly, it is an object of the present invention to provide an installation for increasing the brightness differences in combined lights, especially of blinker and position lights in motor vehicles, which avoids by simple means the aforementioned shortcomings and drawbacks encountered in the prior art.

Another object of the present invention resides in an installation for increasing the brightness differences in combined lights which assures an unequivocal individual recognition of the two lights.

A further object of the present invention resides in an installation of the type described above in which the two lights do not mutually interfere with one another so that the recognizability of the blinker signal is not impaired by the already prevailing background brightness of the position light.

Still another object of the present invention resides in a system for increasing the brightness differences in combined lights so that the turned-on condition of each of the two lamps can be clearly defined also for distant observers.

Figure 2:
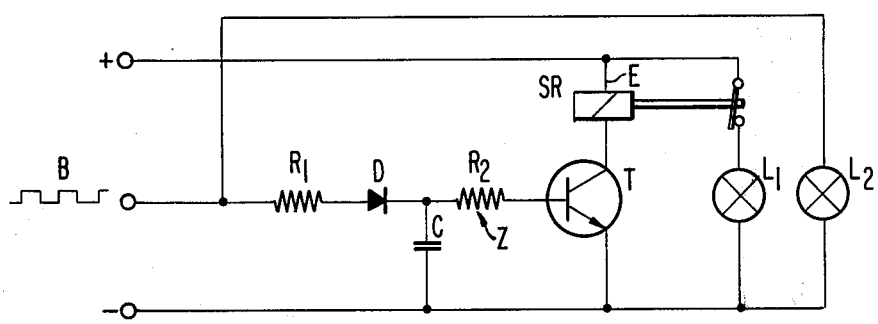

These and other objects, features and advantages of the present invention will become more apparent from the following description when taken in connection with the accompanying drawing which shows, for purposes of illustration only, two embodiments in accordance with the present invention, and wherein:

FIG. 1 is a schematic circuit diagram illustrating the principle of a circuit in accordance with the present invention for an installation to increase the brightness of combined lights; and FIG. 2 is a schematic circuit diagram of a blinker circuit in accordance with the present invention.

Referring now to the drawing wherein like reference characters are used throughout the two views to designate like parts, reference will be made in the following text to individual lights or lamps. However, corresponding to the explanation hereinabove, the principle according to the present invention is also applicable to two-filament lamps, whence reference to lights or lamps in the following description is intended to include analogously the concept of "filaments" instead of "separate lamps."

According to FIG. 1, a first lamp $L_1$ is adapted to be switched on and off by way of a first switch $S_1$ and a second lamp $L_2$ is adapted to be switched on and off by way of a second switch $S_2$. The lamp $L_2$ is designed to be brighter than the lamp $L_1$, for example. The contact of a normally closed switching relay $S_R$ is connected in the energizing circuit of the first lamp $L_1$ in series with the switch $S_1$; the contact of the switching relay $S_R$ is thereby closed in the de-energized condition. The energizing circuit E of the switching relay $S_R$ is connected in parallel to the lamp $L_2$, i.e., it is also turned on by way of the switch $S_2$.

If in the illustrated circuit the switch $S_1$ is actuated, then the lamp $L_1$ lights up. If now in this switched-on condition of the lamp $L_1$, the switch $S_2$ for the lamp $L_2$ is actuated, then the lamp $L_2$ lights up and simultaneously the switching relay $S_R$ is energized by way of the energizing circuit E and attracts its armature. As a result thereof, the switch or contact at the switching relay $S_R$ opens and the lamp $L_1$ extinguishes. This extinction lasts until the switch $S_2$ is again opened and the lamp $L_2$ is turned off. The lamp $L_1$ is then automatically energized again, i.e., supplied with current, since the switching relay $S_R$ now closes again. Of course, if the switch $S_1$ should have been opened in the meantime, then the lamp $L_1$ also continues to remain dark.

According to FIG. 2, the lamp $L_1$ is the position or width-indicating light of a motor vehicle which together with the blinker or turn-indicator lamp $L_2$ is accommodated in a common housing. The basic circuit is functionally the same as the circuit of FIG. 1 whereby, however, the two switches $S_1$ and $S_2$ have been omitted for the sake of clarity. The switching relay $S_R$ is again connected in the energizing circuit E which in this case is controlled by way of a transistor T. The blinker pulses B obtained by conventional means are fed by way of a current-limiting resistance $R_1$, a blocking diode D and a time-constant circuit Z to the base of the transistor T which is rendered conductive and therewith causes the switching relay $S_R$ to attract its armature. As a result thereof, the lamp $L_1$ is turned off. The time-constant Z, which consists of the condenser C and of the resistance $R_2$, is so selected that its decay-time is greater than the dark period of the flasher or blinker unit. Consequently, during this dark period, the condenser C is discharged at a slow rate so that the transistor T remains conductive. Only when the flasher or blinker unit is turned off and the blinker pulses B disappear, will the relay $S_R$ again drop off and the lamp $L_1$ again light up.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for controlling lights to render the lights more distinctly visible comprising a pair of light means each including first and second lights, a source of energizing voltage, first means for selectively connecting the first light of each of said pair of light means to said source of energizing voltage, a source of periodic voltage pulses, second means for selectively connecting one of said second lights of said pair of light means to said source of periodic voltage, and control means responsive to connection of one of said second lights to said source of periodic voltage for disconnecting only the first light of the same light means from said source of energizing voltage independently of said first means.

2. An installation according to claim 1, characterized in that the second light of each of said light means is a turn indicator light and the first light of each of said light means is a position-light in a motor vehicle.

3. An installation according to claim 2, characterized in that the first and second lights in each light means are accommodated in a common housing.

4. An installation according to claim 2, characterized in that the first and second lights in each light means are arranged in direct proximity of one another.

5. An installation as defined in claim 1 wherein said control means comprises a pair of relays respectively connected to said pair of light means, each relay including a relay switch and a relay coil for operating said switch upon application of a voltage thereto, said relay coil being connected to said second light so as to be energized and said relay switch being connected to said first light to deenergize said first light upon energization of the relay coil associated therewith.

6. An installation according to claim 5, characterized in that the first and second lights of each of said light means are formed by a single lamp having two filaments.

7. An installation according to claim 5, characterized in that the first and second lights of each of said light means are accommodated in a common housing.

8. An installation according to claim 5, characterized in that the first and second lights of each of said light means are arranged in direct proximity of one another.

* * * * *